US009367878B2

(12) United States Patent
Rao

(10) Patent No.: US 9,367,878 B2
(45) Date of Patent: Jun. 14, 2016

(54) SOCIAL CONTENT SUGGESTIONS BASED ON CONNECTIONS

(75) Inventor: Supreeth Hosur Nagesh Rao, Sunnyvale, CA (US)

(73) Assignee: YAHOO! INC., Sunnyvale, CA (US)

( * ) Notice: Subject to any disclaimer, the term of this patent is extended or adjusted under 35 U.S.C. 154(b) by 180 days.

(21) Appl. No.: 13/606,598

(22) Filed: Sep. 7, 2012

(65) Prior Publication Data

US 2014/0074856 A1 Mar. 13, 2014

(51) Int. Cl.
*G06F 17/30* (2006.01)
*G06Q 50/00* (2012.01)

(52) U.S. Cl.
CPC .................................... *G06Q 50/01* (2013.01)

(58) Field of Classification Search
CPC .......... G06F 17/30867; G06F 17/3053; G06Q 30/0633
See application file for complete search history.

(56) References Cited

U.S. PATENT DOCUMENTS

2006/0155764 A1* 7/2006 Tao .................. G06F 17/30867
2008/0294617 A1* 11/2008 Chakrabarti et al. ............. 707/5
2009/0132368 A1* 5/2009 Cotter et al. .................... 705/14
2010/0076857 A1* 3/2010 Deo et al. ........................ 705/26
2010/0153404 A1* 6/2010 Ghosh et al. .................. 707/748
2010/0274815 A1* 10/2010 Vanasco ........................ 707/798
2011/0173198 A1* 7/2011 Malleshaiah ..... G06F 17/30867 707/737
2013/0191401 A1* 7/2013 Xia .................. G06F 17/30858 707/751
2013/0212479 A1* 8/2013 Willis et al. .................. 715/736

* cited by examiner

*Primary Examiner* — Mariela Reyes
*Assistant Examiner* — Courtney Harmon
(74) *Attorney, Agent, or Firm* — Cooper Legal Group, LLC

(57) ABSTRACT

A system and method for recommending content to a user in a social network, including: logging user activity for the user in the social network; categorizing the user activity across all the user's networks, wherein each category is assigned a score based on relevance to the user; assigning weights to the user activities; calculating a social index score as a function of the weighted user activity categories; logging user content into categories; scoring the user content; and generating a content social index by weighting the content scores.

20 Claims, 6 Drawing Sheets

Interest Social Index for a user:

| Activity | Category | Category Weight | Type | Score |
|---|---|---|---|---|
| Click | Entertainment | 0.45 | Adclick | 0.3 |
| Subscription | Sports | 0.35 | Group Subscription | 0.1 |
| Search | Sports/Cricket | 0.25 | Keyword:World Cup | 0.6 |

Interest Social Index for a user:

| Activity | Category | Category Weight | Type | Score |
|---|---|---|---|---|
| Click | Entertainment | 0.45 | Adclick | 0.3 |
| Subscription | Sports | 0.35 | Group Subscription | 0.1 |
| Search | Sports/Cricket | 0.25 | Keyword:World Cup | 0.6 |

*FIG. 5*

SOCIAL CONTENT SUGGESTIONS BASED ON CONNECTIONS

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of online social networking, and more particularly relates to the field of content contribution in social networks.

BACKGROUND OF THE INVENTION

Today social sites provide friend recommendations or recommendations to follow or subscribe an item. These recommendations are quite popular on sites such as Twitter, Facebook, LinkedIn, Yahoo!, Google, and others. The key driver in these sites is "who" should one start following or connect to in order to improve one's social experience. These current offerings ignore a key component to a meaningful social experience—content. Today when someone participates in a social network, they end up contributing content, but that content doesn't always engender meaningful conversations; in fact, some of it is ignored.

Current social engines are adept at recommending friends and new connections. There are some content recommendation engines such as Yahoo! Front Page "today module" and LinkedIn's buzzing news section. But none of them recommend content for the purpose of leading to more engaging social connections. There is a need for a system and method to overcome the above-stated shortcomings of the known art.

SUMMARY OF THE INVENTION

Briefly, according to an embodiment of the invention a method for recommending content to a user in a social network includes steps or acts of: logging user activity for the user in the social network; categorizing the user activity across all the user's networks, wherein each category is assigned a score based on relevance to the user; assigning weights to the user activities; calculating a social index score as a function of the weighted user activity categories; logging user content into categories; scoring the user content; and generating a content social index by weighting the content scores.

According to another embodiment of the present invention, an information processing system includes: a memory with computer-executable instructions stored therein; and a processor device operably coupled with the memory. The computer-executable instructions include: logging user activity for the user in the social network; categorizing the user activity across all the user's networks, wherein each category is assigned a score based on relevance to the user; assigning weights to the user activities; calculating a social index score as a function of the weighted user activity categories; logging user content into categories; scoring the user content; and generating a content social index by weighting the content scores.

According to another embodiment of the present invention, a computer program product includes a non-transitory computer readable storage medium with computer-executable instructions stored thereon. The computer-executable instructions include: logging user activity for the user in the social network; categorizing the user activity across all the user's networks, wherein each category is assigned a score based on relevance to the user; assigning weights to the user activities; calculating a social index score as a function of the weighted user activity categories; logging user content into categories; scoring the user content; and generating a content social index by weighting the content scores.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which:

FIG. 5 is an exemplary social index for a user, according to an embodiment of the present invention.

Figure 1:
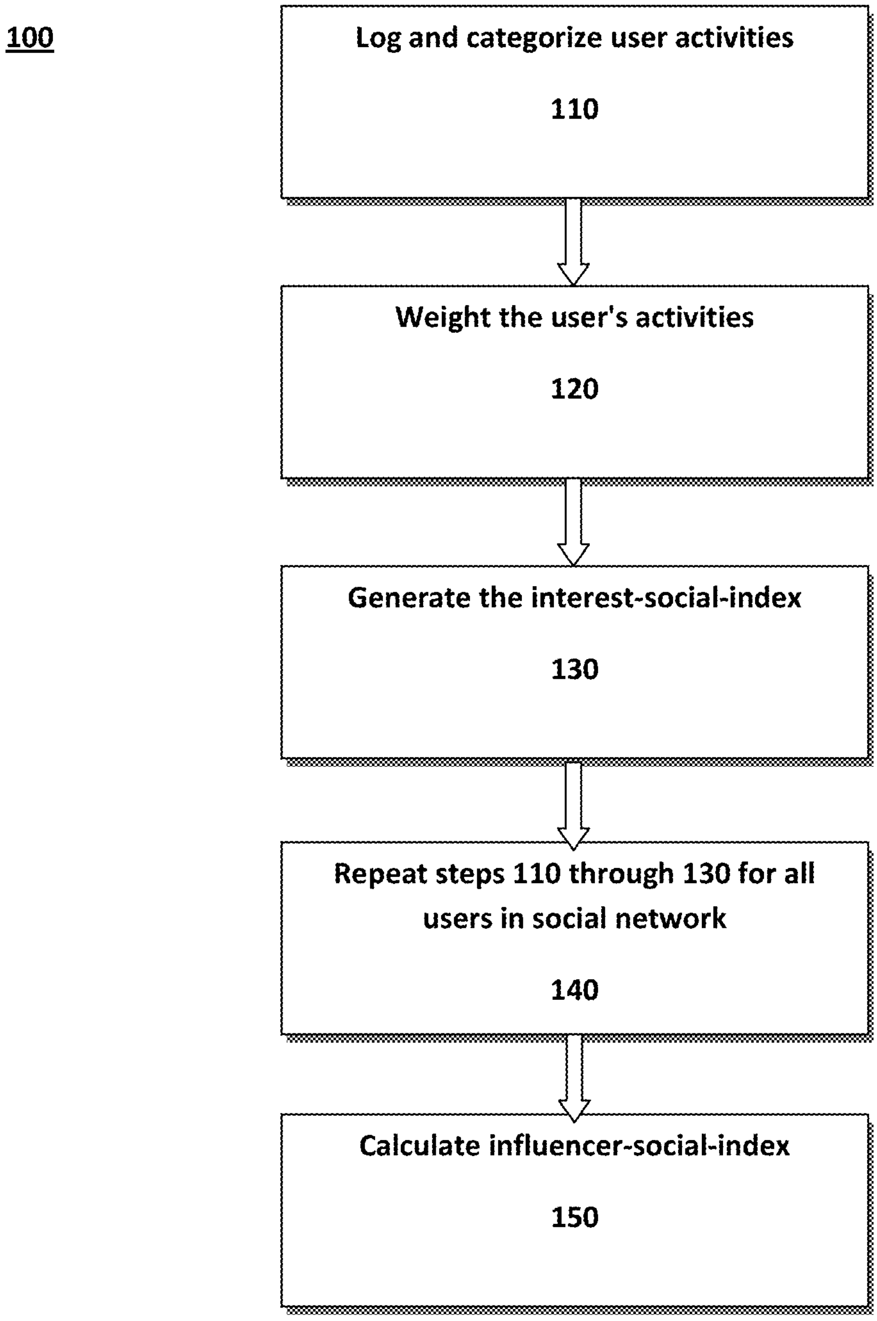
FIG. 1 is a flowchart of a method according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe a content recommendation engine for increased social interactions. We recommend content to a user on a social network to help increase engagement around that content in a meaningful manner. The methodology also helps get to the content which the user might want to create or circulate now which will influence or attract future connections. For social users this generates improved engagement and conversations. We can also recommend new users using content affiliations. For businesses this can become a social marketing tool.

Some of the benefits and advantages of this content recommendation engine are:

a) Increasing engagement within a social group;

b) Decreasing the spam the follows from the same social content being circulated many times;

c) Becoming a tool for celebrities to attract and engage new social connections;

d) Social publishers like Yahoo, Twittter, Facebook, will benefit with higher engagement; and e) Social marketing tool to decide what content should be targeted to what user categories.

Today when someone participates in a social network, they generally contribute content. Some of this content may result in meaningful conversations; some of it is ignored. This method increases the likelihood that a social user's content will result in an engaging communication by answering the question "What content do I post or Tweet to increase my engagement with my social connections?" The methodology described here proposes a way for a given user to help create social content which will be liked by the current or future set of connections. Here are some concrete examples:

a) On Facebook or Google+—"What is the current topic that I must post so that I can have a meaningfully engaging conversation with my connections?"

b) On Twitter—"What should I tweet about (either a retweet or new content) that can help start a meaningful conversation with my connections?"

Using this method helps people to create easy avenues to update their social networks or contexts with suggested content. In one embodiment of the present invention, the methodology views a person's social connections and suggests content that he/she must circulate in order to improve engagement with one's existing social connections. This is different from Social Chrome or Facebar which showcases all the activities from friends. We recommend new avenues to create activities. This will encourage more socially meaningful and engaging conversations.

Referring now to the drawings and to FIG. 1 in particular, we show a high-level flowchart for identifying meaningful social content. First in step 110, for each user within a social network, we log all of the activities in which he/she engages. We also categorize the activities into pre-defined interest categories, such as sports, social events, politics, movies, and the like. The categories are based on a model that helps to organize online content into a set of partitions which have user interests like sports, entertainment, and the like. The categories can also be in a hierarchical ordering and an example is shown in FIG. 5 for "Cricket" where "Cricket" is a sub-category of "Sports."

Within each category we also note the activity (click, search, subscription). Within each activity, the type determines what the action that we have logged is related to. If the action is a click, then we determine what type—an ad-click or a page click. A score helps to determine how much value to assign to that activity for a user. The score is typically obtained by looking at all user activity and using standard machine-learning techniques for classification and regression. This is typically determined by using all of the user's activities. We look at all of the user data we have and classify and obtain weights based on how important some of the activities appear to be (as determined by number of actions related to the activities). For example, we need to determine if search is a more important activity than a page-view. In some cases this cannot be determined, so we assign a default value. In this example, search is assigned a higher value than a page view because the search term represents the user's intent; whereas a page-view might just be navigational.

We assign category weights as well. This is dependent on the activity of a single user within a category. It needs to be computed based on all of a user's activity across online mediums. If a user spends a lot of time in category "entertainment" and less time on category "sports," the entertainment category receives a higher weight.

In step 120 we score and weight the logged activities. Some of the activities we log and weight (in increasing order) are:

a) browsing content through the social network or the online medium about sports;

b) searching content related to a category;

c) clicking on ads for a given category;

d) Subscriptions in a category e) Explicit declared interests and activities like RSS subscription, group subscription etc.

Note that the scores are constantly updated because the user's own activities determine the scores. For example, the score for the category "sports" will increase when a user searches content in that category or clicks on an ad for that category. Next we weight the scores to generate an interest_social_index (isi) within a social network, in step 130. The isi is a vector which means it is a weighed score having many dimensions. It has values for a variety of interests associated with a user. The scores are given weight based on the interest activity. For example, a browse carries less weight than a search; a search carries less weight than a click; and a click carries less weight than a subscription.

The formula to calculate the interest_social_index is:

$$\text{interest\_social\_index}=f(w1*c1+w2*c2+w3*c3\ldots)$$

where w is the weight based on the interest activity like click, view, subscription or search and is determined using a data modeling exercise;

c is the category of interest based on a hierarchy like sports, politics etc.

Referring again to FIG. 5, the Interest_social_index is a vector of f((score of action adclick*category score of a user in entertainment)+(score of a search*category score of a user in sports/cricket)+(score of group subscription*category score of the user in sports)). Based on the log shown in FIG. 5 and assuming a very simple multiplier function:

$$\text{Interest\_social\_index for the user listed}=0.13e+0.1s+0.15cs\text{ where}$$

e=entertainment s=sports cs=sports/cricket

In step 140 we derive the interest_social$_{13}$ index for all the users in the specified social network by repeating steps 110 through 130 for each user in the network. Then in step 150, once we have the interest_social_index score for all the users in a given social network, we can determine the influencer_social_index score based on the interest_social_index of all the connections, as follows:

$$\text{influencer\_social\_index}=g(\text{interest\_social\_index of all social connections+recent activity stream or timeline of activities+factors listed below}\ldots).$$

where g is a function that computes the score based on the interest_social_index of all social connections.

These are the factors that influence computation of influencer_social_index and have an impact on the function "g":

interest_social_index of all the connections;

recent activity stream of all the connections;

trends based on activity in the location, age, gender, income segment;

trends based on breaking news activity;

recent searches which led to the profile of the user for whom we are generating the recommendations; and social graph with reference to segmented connections based on demographics, geographic and technographic attributes.

Once we have computed the influencer_social_index and interest_social_index for a given user on a social network, we then try to surface the content which maps to these vectors. The recent activity is included in the formula as an indicator because it helps to eliminate repeated posts of the same content, which is one one of the reasons so many posts are ignored.

Figure 2:
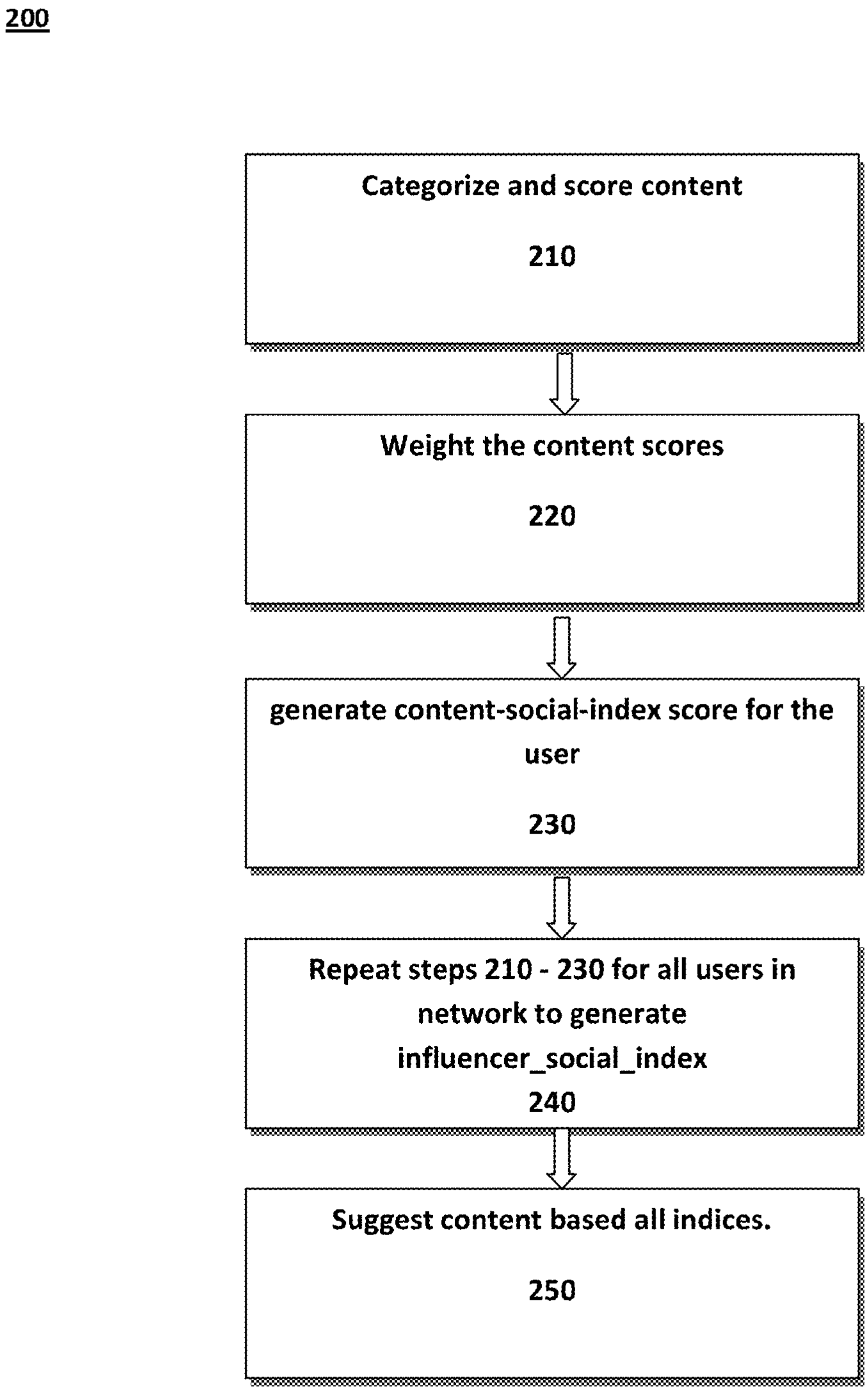
FIG. 2 is a flowchart of a method according to another embodiment of the present invention.

Referring now to FIG. 2 we provide a flowchart of a method for mapping content to the influencer_social_index and interest_social_index we generated by following the steps of FIG. 1. In step 210, just as we categorized the user activity, we now categorize the content into the same set of categories and hierarchy as "c" mentioned in the computation of interest_social_index. In step 220 we weight the score for every content page, video, audio, post on Facebook, Tweet, and the like. This is also a weighted vector we call content_social_index.

content_social_index=k (category of the content, search terms leading to the content, links which link to this content on the web, social_index categories of the users consuming this content, and the like). The content_social_index is a vector which has the number for a list of categories. The score within each category which constitutes the vector depends on: a) the category to which the content belongs; b) the category of search terms that are helping this content drive traffic (if the terms like "football," "NFL" drive traffic to this content piece, then we weigh in the category score for "sports"); c) category of content which links to this content asset (if many sports sites link to this content, we will weigh the link into sports category; and d) social_index of users who are consuming this content (this is the social index of the users who are interacting with this content or clicking at different locations to arrive at this content). Once we have the content_social_index, and the influencer_social_index and interest_social_index (from steps 110-150 in FIG. 1), then for every user within the social network we derive:

a) New social content which will help increase engagement with existing users as a function of (content_social_index, influencer_social_index); and b) New social content that can attract and engage future users as a function of (content_social_index, influencer_social_index and interest_social_index).

Figure 3:
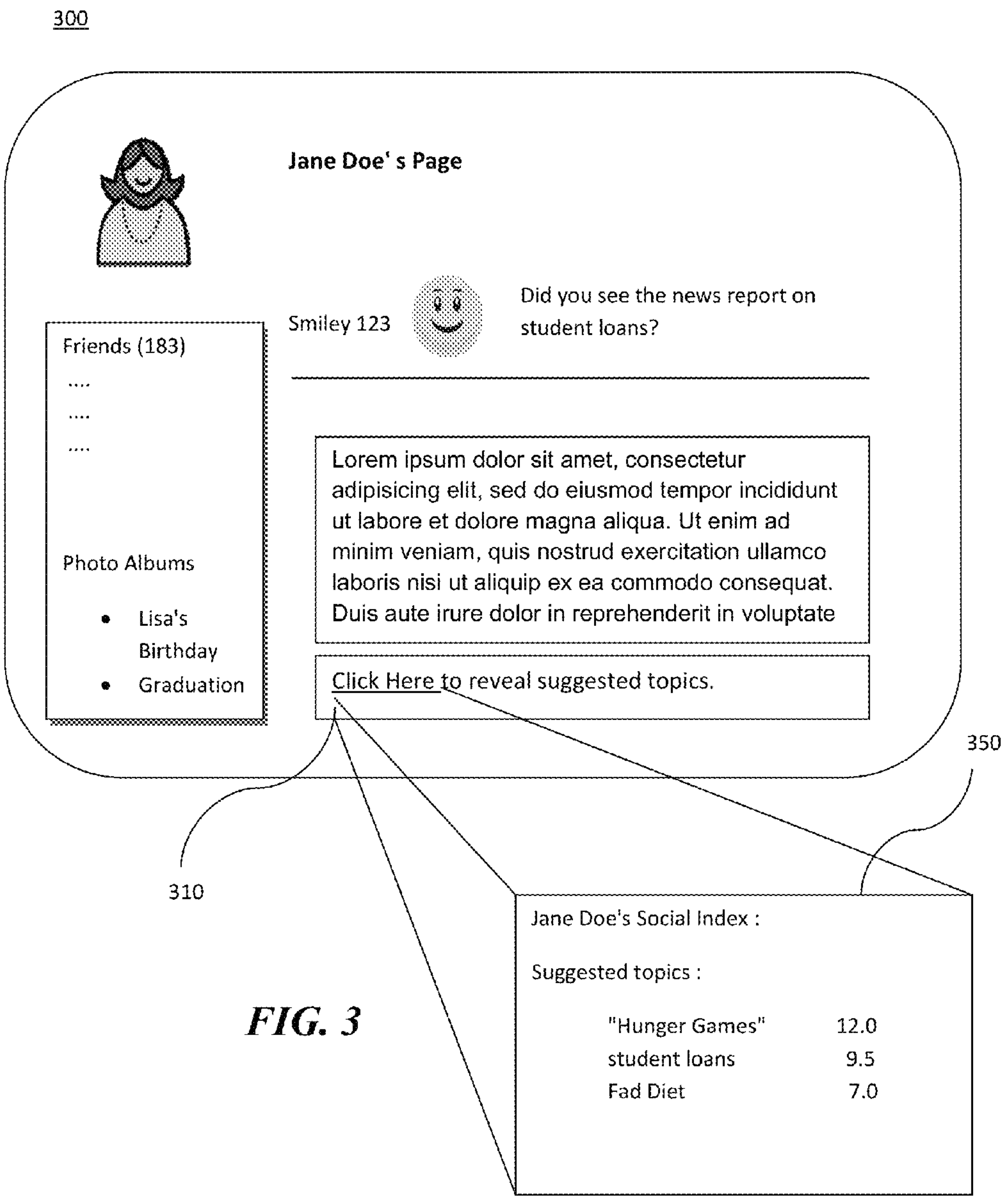
FIG. 3 is an exemplary illustration of a use case scenario according to an embodiment of the present invention.

Referring now to FIG. 3, we show an exemplary illustration of one possible embodiment wherein a method according to the invention is advantageously used. We show a user's social page 300 where the user is able to interact with those in his/her social network. On the user's page 300 a prompt 310 asks the user to click to reveal suggested topics of content. From the calculations performed in FIGS. 1 and 2, it has been determined that the topics most likely to engage others in her social network are: the movie "Hunger Games" in the entertainment category with a content_social_index of 12.0; student loans in the finance category with a content_social_index of 9.5 and the latest fad diet in the health category with a content_social_index of 7.0.

Figure 4:
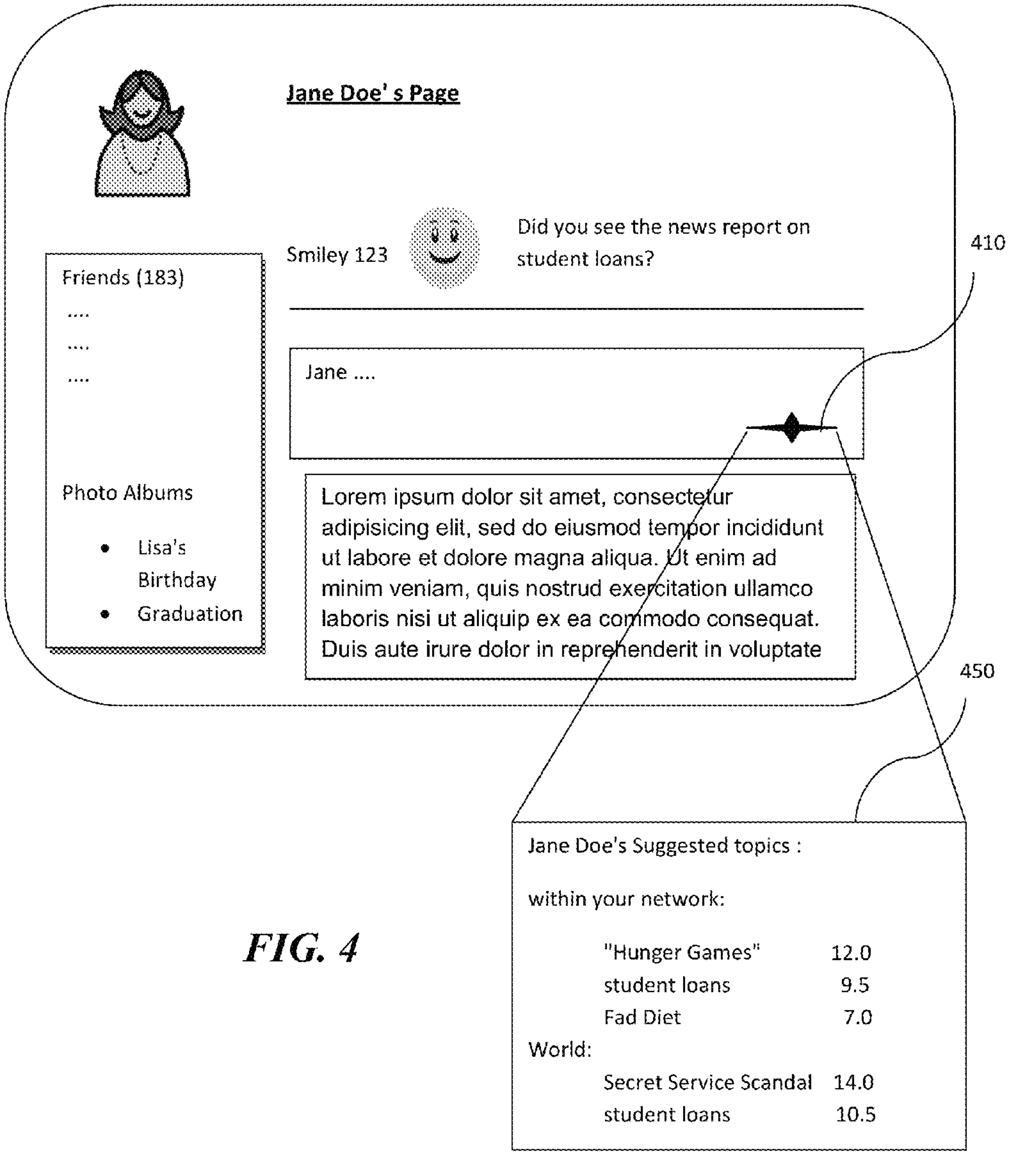
FIG. 4 is an exemplary illustration of another use case scenario according to an embodiment of the present invention.

FIG. 4 shows another embodiment wherein, instead of a textual prompt, the user is presented with an icon 410 on his/her page. In this example, the icon 410 appears in a text box where the user is able to enter text to correspond with a social connection. Before answering, the user can click on the icon 410 to reveal the suggested topics that have been calculated for her in a pop-up window 450 or overlay. In this window 450 we see that the suggested topics are matched based on activity within the user's social group. That is, for the given user, his/her social group becomes a qualification for suggestion.

The content recommendation engine can be implemented in many ways. Some of these are:

a) as a tool hosted on a social networking site to suggest engaging (with the user's connections) content which can be surfaced on other networks.

b) surfacing a content_social_index and matching it up with other user's social_indices, we can recommend more engaging content based on the social connections c) generate targeting segments using the indices for advertisers to reach a new audience. This will have a revenue impact for online advertising including social media advertising.

d) generate methodologies for creating audience and content segments, we can provide users who connect with a social site a differentiating experience.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Hardware Embodiment

Figure 6:
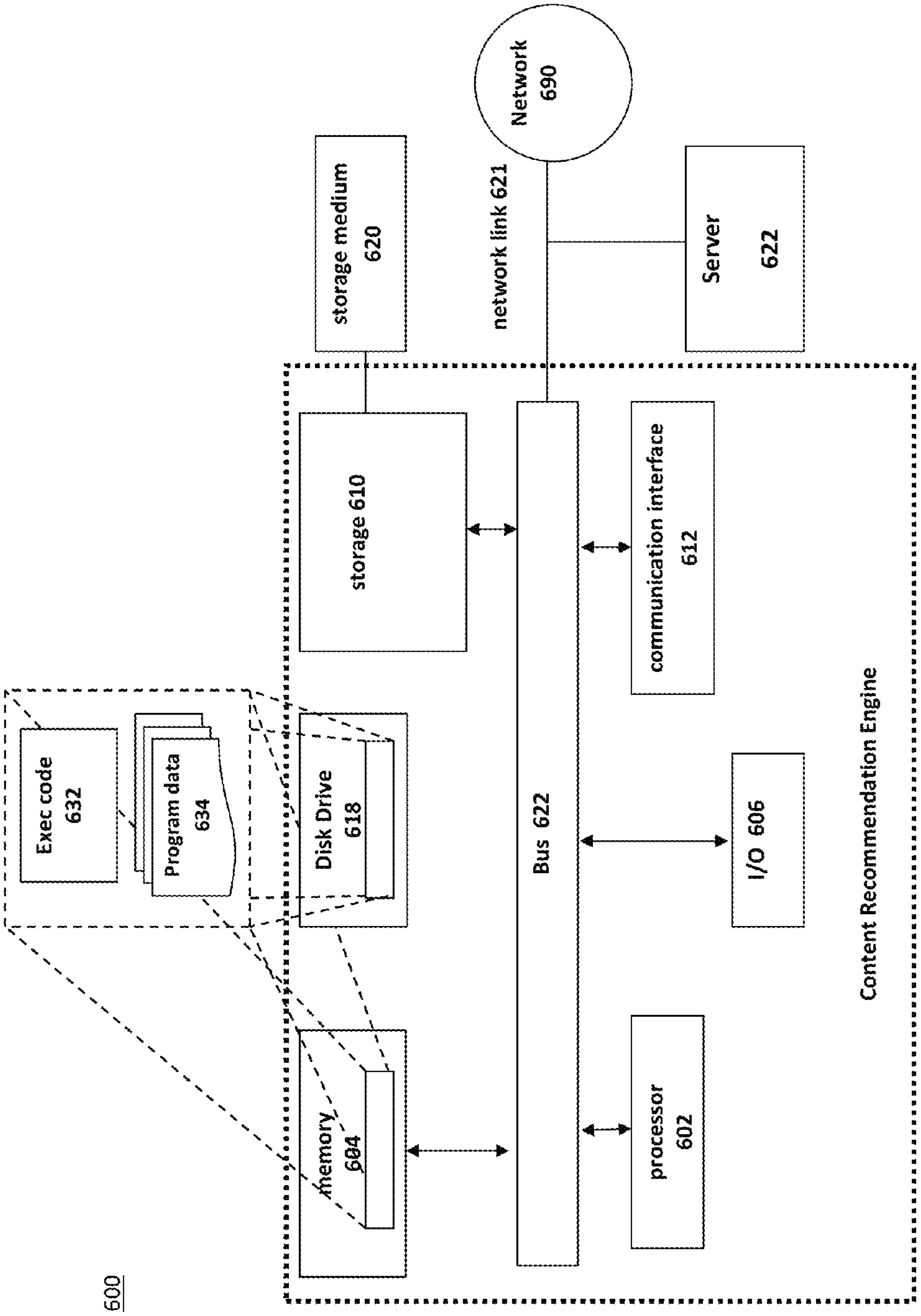
FIG. 6 is a high-level block diagram of an information processing system configured to operate according to the invention.

Referring now in specific detail to FIG. 6, there is provided a simplified high-level block diagram of the content recommendation engine 600 for implementing content recommendation according to embodiments of the present invention For purposes of this invention, content recommendation engine 600 may represent any type of computer, information processing system or other programmable electronic device, including a client computer, a server computer, a portable computer, an embedded controller, a personal digital assistant, and so on. The engine 600 may be a stand-alone device or networked into a larger system. Engine 600, illustrated for exemplary purposes as a networked computing device, is in communication with other networked computing devices (not shown) via network 690. As will be appreciated by those of ordinary skill in the art, network 690 may be embodied using conventional networking technologies and may include one or more of the following: local area networks, wide area networks, intranets, public Internet and the like.

In general, the routines which are executed when implementing these embodiments, whether implemented as part of an operating system or a specific application, component, program, object, module or sequence of instructions, will be referred to herein as computer programs, or simply programs. The computer programs typically comprise one or more instructions that are resident at various times in various memory and storage devices in an information processing or handling system such as a computer, and that, when read and executed by one or more processors, cause that system to perform the steps necessary to execute steps or elements embodying the various aspects of the invention.

Throughout the description herein, an embodiment of the invention is illustrated with aspects of the invention embodied solely on engine 600, for simplicity. As will be appreciated by those of ordinary skill in the art, aspects of the invention may be distributed among one or more networked computing devices which interact with engine 600 via one or more data networks such as, for example, network 590. However, for ease of understanding, aspects of the invention have been described as embodied in a single computing device—engine 600.

Engine 600 includes processing device 602 which communicates with an input/output subsystem 606, memory 604, storage 610 and network 690. The processor device 602 is operably coupled with a communication infrastructure 622 (e.g., a communications bus, cross-over bar, or network). The processor device 602 may be a general or special purpose microprocessor operating under control of computer program instructions 632 executed from memory 604 on program data 634. The processor 602 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 604 may be partitioned or otherwise mapped to reflect the boundaries of the various memory subcomponents. Memory 604 may include both volatile and persistent memory for the storage of: operational instructions 632 for execution by processor device 602, data registers, application storage and the like. Memory 604 may include a combination of random access memory (RAM), read only memory (ROM) and persistent memory such as that provided by a hard disk drive 618. The computer instructions/applications that are stored in memory 604, such as instructions for implementing the steps of FIG. 1 and FIG. 2, are executed by processor 602. The computer instructions/applications 632 and program data 634 can also be stored in hard disk drive 618 for execution by processor device 602. The Server 622 pictured here is a representation of a plurality of servers and other engines such as social network engines with which the engine 600 may interact through a network such as the Internet through network link 621.

Those skilled in the art will appreciate that the functionality implemented within the blocks illustrated in the diagram may be implemented as separate components or the functionality of several or all of the blocks may be implemented within a single component. The I/O subsystem 606 may include various end user interfaces such as a display, a keyboard, and a mouse. The I/O subsystem 606 may further comprise a connection to a network 690 such as a local-area network (LAN) or wide-area network (WAN) such as the Internet.

The engine 600 may also include storage 610, representing a magnetic tape drive, an optical disk drive, a CD-ROM drive, and the like. The storage drive 610, which can be removable, reads from and/or writes to a removable storage unit 620 in a manner well known to those having ordinary skill in the art. Removable storage unit 620, represents a compact disc, magnetic tape, optical disk, CD-ROM, DVD-ROM, etc. which is read by and written to by removable storage drive 610. As will be appreciated, the removable storage unit 620 includes a non-transitory computer readable medium having stored therein computer software and/or data for implementing the real-time feedback collection system.

The engine 600 may also include a communications interface 612. Communications interface 612 allows software and data to be transferred between the computer system and external devices. Examples of communications interface 612 may include a modem, a network interface (such as an Ethernet card), a communications port, a PCMCIA slot and card, etc. Software and data transferred via communications interface 612 are in the form of signals which may be, for example, electronic, electromagnetic, optical, or other signals capable of being received by communications interface 612.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

I claim:

1. A method for recommending content in a social network, comprising:

logging a set of actions of a user;

categorizing the set of actions into interest categories;

weighting the interest categories to generate weighted interest categories, the weighting comprising:

for a first interest category associated with a first subset of the set of actions:

identifying one or more types of actions associated with the first interest category, respective types of actions associated with an action weight, the identifying comprising:

identifying a first type of action corresponding to a search action, a second type of action corresponding to a subscribe action, and a third type of action corresponding to a click action, the first type of action, the second type of action and the third type of action associated with the first interest category, the first type of action having a first action weight, the second type of action having a second action weight, and the third type of action having a third action weight; and assigning a first weight to the first interest category based on the one or more types of actions associated with the first interest category and an action weight associated with each of the one or more types of actions;

calculating an interest social index for the user as a function of the weighted interest categories; and providing, on a social page associated with the social network, and based on the interest social index, a first indication of a first suggested topic and a first value corresponding to a likelihood of one or more users in the social network engaging the first suggested topic and a second indication of a second suggested topic and a second value corresponding to a likelihood of one or more users in the social network engaging the second suggested topic.

2. The method of claim 1, comprising:

calculating an influencer social index based on the interest social index and one or more searches which led to a profile of a second user.

3. The method of claim 1, the assigning comprising:

multiplying the first action weight by a first portion of the first subset associated with the first type of action to generate a first weighted component of the first interest category;

multiplying the second action weight by a second portion of the first subset associated with the second type of action to generate a second weighted component of the first interest category; and multiplying the third action weight by a third portion of the first subset associated with the third type of action to generate a third weighted component of the first interest category.

4. The method of claim 3, the assigning comprising:

combining the first weighted component with the second weighted component and the third weighted component to yield the first weight.

5. The method of claim 1, the providing performed responsive to a selection of a prompt on the social page.

6. The method of claim 1, comprising:

logging content created by the user; and scoring the content.

7. The method of claim 6, the scoring the content comprising:

scoring the content based on a number of entities linking to the content.

8. The method of claim 6, the scoring the content comprising:

scoring the content based on a category to which the content relates.

9. The method of claim 6, the scoring the content comprising:

scoring the content based on interest social indexes of one or more users viewing the content.

10. The method of claim 1, comprising:

logging a second set of actions of a second user within the social network of the user;

categorizing the second set of actions into a second set of interest categories;

weighting the second set of interest categories to generate a second set of weighted interest categories, the weighting comprising:

for a second interest category associated with a second subset of the second set of actions:

identifying one or more types of actions associated with the second interest category, respective types of actions associated with an action weight; and assigning a second weight to the second interest category based on the one or more types of actions associated with the second interest category and an action weight associated with each of the one or more types of actions; and calculating an interest social index for the second user as a function of the weighted interest categories.

11. The method of claim 10, comprising:

calculating an influencer social index for the user based on the interest social index for the second user.

12. The method of claim 11, comprising:

recommending new content for the user to generate based on the influencer social index and the interest social index for the user.

13. The method of claim 12, the recommending comprising:

recommending the new content based on a content social index, the content social index derived based on content created by the user.

14. An information processing system for recommending content in a social network, said information processing system comprising:

a processor; and memory comprising computer-executable instructions that when executed by the processor perform a method, comprising:

for a user:

logging a set of actions;

categorizing the set of actions into interest categories;

weighting the interest categories to generate weighted interest categories, the weighting comprising:

for a first interest category associated with a first subset of the set of actions:

identifying one or more types of actions associated with the first interest category, respective types of actions associated with an action weight, the identifying comprising:

identifying a first type of action corresponding to a search action, a subscribe action or a click action, a second type of action, and a third type of action, the first type of action, the second type of action and the third type of action associated with the first interest category, the first type of action having a first action weight, the second type of action having a second action weight, and the third type of action having a third action weight; and assigning a first weight to the first interest category based on the one or more types of actions associated with the first interest category and an action weight associated with each of the one or more types of actions; and calculating an interest social index for the user as a function of the weighted interest categories;

for a second user within the social network of the user:

logging a second set of actions;

categorizing the second set of actions into a second set of interest categories;

weighting the second set of interest categories to generate a second set of weighted interest categories; and calculating an interest social index for the second user as a function of the weighted interest categories; and calculating an influencer social index for the user based on the interest social index for the second user.

15. The information processing system of claim 14, the method comprising:

recommending new content for the user to generate based on the influencer social index and the interest social index for the user.

16. The information processing system of claim 14, the logging a set of actions comprising:

logging the set of actions from across multiple online mediums.

17. The information processing system of claim 14, the first type of action corresponding to the search action.

18. The information processing system of claim 14, the first type of action corresponding to the subscribe action.

19. The information processing system of claim 14, the first type of action corresponding to the click action.

20. A computer program product comprising a non-transitory computer readable storage medium with computer-executable instructions stored thereon, said computer-executable instructions comprising:

logging a set of actions of a user;

categorizing the set of actions into interest categories;

weighting the interest categories to generate weighted interest categories, the weighting comprising:

for a first interest category associated with a first subset of the set of actions:

identifying one or more types of actions associated with the first interest category, respective types of actions associated with an action weight, the identifying comprising:

identifying a first type of action, a second type of action, and a third type of action associated with the first interest category, the first type of action having a first action weight, the second type of action having a second action weight, and the third type of action having a third action weight; and assigning a first weight to the first interest category based on the one or more types of actions associated with the first interest category and an action weight associated with each of the one or more types of actions;

calculating an interest social index for the user as a function of the weighted interest categories; and providing, on a social page, and based on the interest social index, a first indication of a first suggested topic and a first value corresponding to a likelihood of one or more users engaging the first suggested topic and a second indication of a second suggested topic and a second value corresponding to a likelihood of one or more users engaging the second suggested topic.

* * * * *